United States Patent Office 3,045,480
Patented July 24, 1962

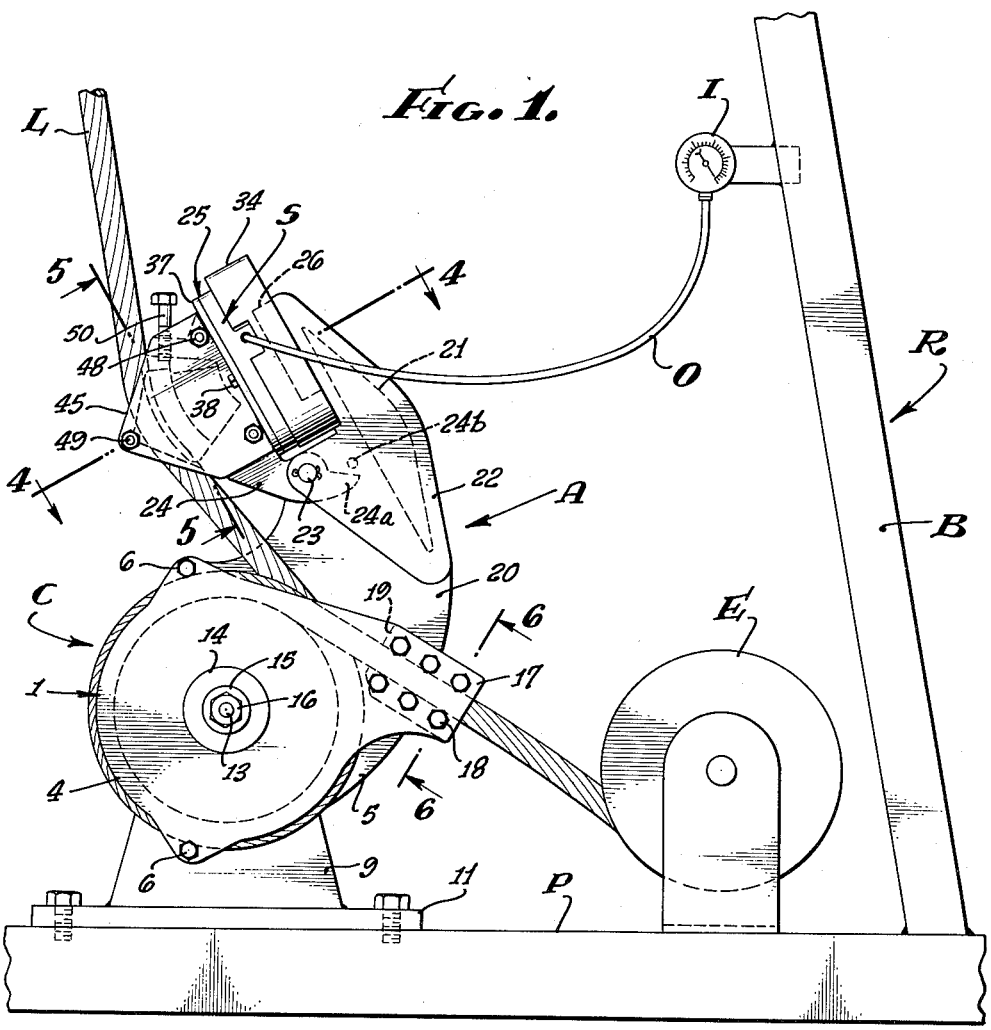

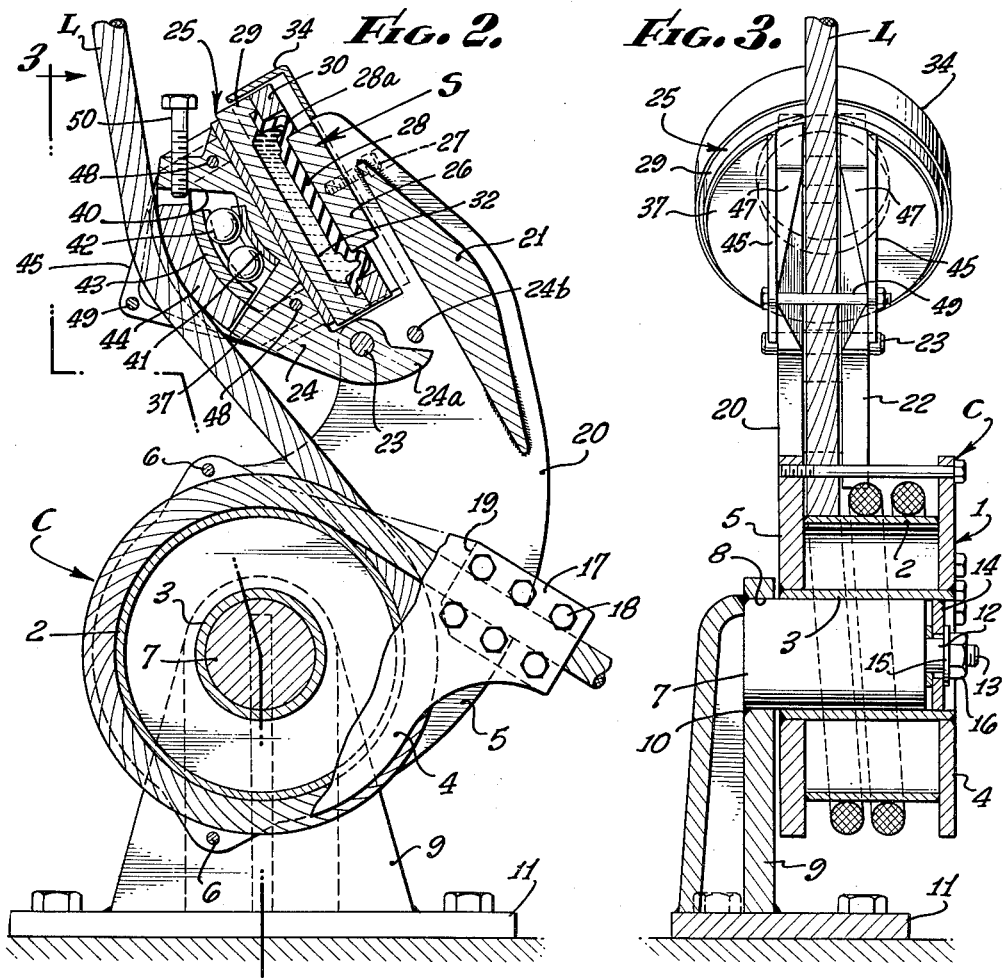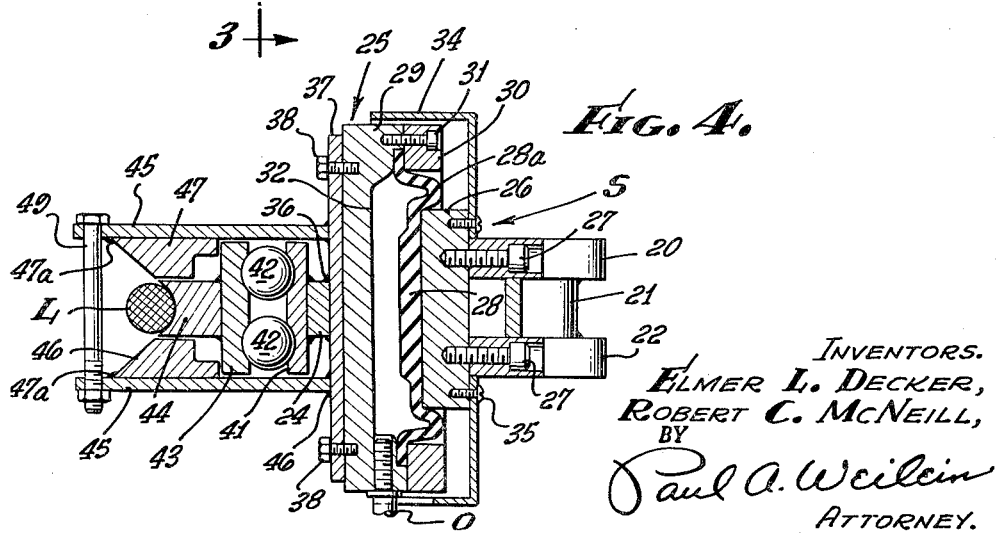

3,045,480
LOAD-SENSING DEAD LINE ANCHOR
Elmer L. Decker and Robert C. McNeill, Long Beach, Calif., assignors to Martin-Decker Corporation, Long Beach, Calif., a corporation of Delaware
Filed Apr. 23, 1959, Ser. No. 808,463
14 Claims. (Cl. 73—144)

The present invention relates to weight indicators, and more particularly to an improved load sensing anchor device especially adapted for use in anchoring and sensing the load on a dead line or anchored run of wire line or cable used in the hoisting equipment of well drilling rigs and the like.

Heretofore, combined load sensing and line anchors have been extensively employed on well drilling rigs, such anchors including a so-called drum which is subjected to a rotative moment as a function of the load on the anchored run of the line. The drum is provided with a lever projecting therefrom and engaged with hydraulic load sensing means between the end of the lever and an adjacent fixed portion of the rig. Such combined anchors and load sensing devices, however, while being quite durable and well accepted, have had certain shortcomings as to accuracy of load indication, due principally to the friction, since the bearing for the anchor is subjected to large radial loads resulting in frictional interference with rotation of the drum, as is required to enable the sensing means to respond to load variations.

In accordance with the present invention, a line anchor and load sensing device is provided which is so constructed that friction is effectively eliminated as a factor in load change response. This objective is accomplished by employing a pair of relatively movable elements between which fluid displacement load sensing means is disposed, the path of relative movement of these elements being controlled so that objectionable relative displacement of such elements is precluded. In addition, sensing of load variations on the line is a function of tension on a deflected section of the line, and means are provided for eliminating friction when the line is engaged by the load sensing means.

With the foregoing in view, it is an object of the present invention to provide a load sensing and line anchoring device of the deflected line type including a line deflecting member, a line engaging member mounted on anti-friction bearings, and load sensing means interposed between the line deflecting and engaging members, so that variations in the tension of the line will be sensed by the sensing means and may be reflected on a weight indicator gauge in the customary manner.

Another object is to provide means for sensing the tension of a deflected line including a line deflecting member, a line engaging member pivotally supported by the deflecting member so as to move towards and away from said deflecting member in a predetermined path, there being load sensing means between the line deflecting and engaging members. In its specific aspects, the invention contemplates, as herein shown, sensing means of the hydraulic displacement type. However, it will be recognized that other known types of load sensing means may be employed in the combination without departing from the spirit of the invention, since other sensing devices per se would also be rendered more responsive and accurate due to the elimination of frictional interference as contemplated the invention.

More specifically, an object of the invention is to provide a line anchor and load sensing device wherein a line anchoring and snubbing wheel or drum is provided with a line deflecting arm projecting therefrom, said arm carrying a line engaging member pivotally connected to the arm, and there being load sensing means interposed between the line engaging member and said arm. In such an organization, the line is anchored to the drum or wheel and the arm will deflect the line as a function of load on the line, causing a rotative moment to be imposed on the anchoring drum or wheel until the line has been deflected to such an extent that the line of force of the line intersects the axis of the drum or wheel. Bearing friction in the drum or wheel mountings is of no serious consequence in this construction, since load response is essentially a function of the deflected line acting on the line engaging member to effect slight movement of the latter towards the deflecting arm, thus to effect operation of the load sensing means. In order to further eliminate friction, the line engaging member is provided with an anti-friction bearing pad or race engageable with the line and acting on the sensing means through anti-friction bearings.

Other objects and advantages of the invention will be hereinafter described or will become apparent to those skilled in the art, and the novel features of the invention will be defined in the appended claims.

Referring to the drawings:

FIG. 1 is a view showing in elevation a load sensing anchor in accordance with the invention, as applied to the platform of a rig;

FIG. 2 is an enlarged view partly in elevation and partly in section of the device of FIG. 1;

FIG. 3 is a view partly in elevation and partly in section, as taken on the line 3—3 of FIG. 2;

FIG. 4 is an enlarged sectional view as taken on the line 4—4 of FIG. 1;

FIG. 5 is an enlarged view in section, as taken on the line 5—5 of FIG. 1; and

FIG. 6 is an enlarged view in section, as taken on the line 6—6 of FIG. 1.

Like reference characters in the several views of the drawings and in the following description designate corresponding parts.

Referring to FIG. 1, a load sensing dead line anchor made in accordance with the invention is generally designated A. The device A is illustrated as being installed on the platform P of a rig R having a generally vertically disposed corner post B.

The combined load sensing device and line anchor A includes a line anchor section C and sensing means S. Load on the line L as sensed by the sensing means S is indicated at an indicator I suitably secured in a convenient position in easy view, as for example, to the corner post B of the rig R.

As herein disclosed, the load sensing means S is of the hydraulic displacement type and, accordingly, a line O leads from the sensing means S to the indicator I. However, it is within the purview of the invention that the sensing means may be other than the specific type shown, without departing from the invention, and a number of the advantageous attributes of the invention will be retained in the case of electrically operated load indicators responding to variations in the resistance of a variable resistance type sensing means, as will be apparent to those skilled in the art.

Inasmuch as, particularly in the case of a well drilling rig, the load sustaining line is changed from time to time, the line L is shown as leading to the load sensing anchor from a supply reel E rotatably supported on the platform P. As shown in FIG. 1, the line leads from the reel E to the anchoring section C.

The anchoring section C of the load sensing anchor comprises a drum or wheel 1. This drum 1 is preferably, as best seen in FIG. 3, of a fabricated construction and includes a tubular line supporting part 2 and a tubular hub 3 suitably secured as by welding between an outer plate 4 and an inner plate 5. In addition, a suitable number of tie bolts 6 interconnect the plates 4 and 5 at their outer margins.

Supporting the drum 1 for rotation is a stub axle 7 extending generally horizontally and supported at one end in an opening 8 in a vertical supporting plate 9 as by welding at 10. This supporting plate 9 is in turn supported on a base plate 11 which is bolted or otherwise suitably secured to the platform P.

At its free end the stub axle 7 is provided with a reduced neck 12 and a threaded stem 13. The hub 3 of the drum 1 has welded therein a retainer plate 14 through which the reduced shaft section 12 extends, and a retainer washer 15 and nut 16 are disposed on the stem 13 to retain the drum 1 against displacement from the shaft 7. Thus, the drum is effectively supported for rotation about a horizontal axis.

Projecting from the outer plate 4 of the drum 1 is a clamp arm 17. This arm has fastened thereto as by screws 18, a clamping plate 19 so that the line L may be effectively clamped to the arm 17. Since the line L is wrapped about the wheel 1, through preferably two loops, the drum will snub the line so that only light clamping pressure on the line between the arm 17 and the plate 19 is required, and damage to the line by the clamping means is thereby avoided. In addition, it will be noted that the mounting of the drum on a stub shaft as herein illustrated, substantially facilitates the installation of a new line without requiring removal of side or other shaft supporting plates as in the case of anchors heretofore available.

The inner plate 5 of the wheel 1 has a lever arm 20 projecting therefrom. This lever arm provides means for deflecting the line L in a manner which will hereinafter more fully appear. In addition, the sensing means S previously referred to is carried at the free end of the lever arm 20. As best seen in FIGS. 2 and 4, the lever arm 20 of the plate 5 is provided with a generally triangular spacer 21 extending from adjacent the free extremity of the lever to substantially its midpoint, and a plate 22 is secured, as by welding or the like, to the spacer 21.

A pivot pin 23 extends between the lever arm 20 and the plate 22, and pivotally supported on the pin 23 between the arm 20 and the plate 22 is a line engaging lever 24. The sensing means S is interposed between the free end of the line engaging lever and the free end of the lever arm 20, so that the line L is deflected by the lever arm 20 through the sensing means and the line engaging lever 24. Thus, the sensing means will transmit to the indicator I fluid under a pressure related to the rotative force applied to the drum by the line required to maintain the line of application of such force aligned with the axis of rotation of the drum 1.

In the illustrative embodiment, the sensing means S includes a pressure cell carried by one lever and a pressure pad engaged with the cell and carried by the other lever. As best seen in FIGS. 2 and 4, the specific arrangement shown is one wherein the pressure cell is designated 25 and is carried by the line engaging lever 24, while the pressure pad is designated 26 and is carried by the lever arm 20.

Referring particularly to FIG. 4, the pressure pad is a disc-like member secured to the lever arm 20 and the plate 22 as by recessed cap screws 27. The pressure pad is engaged with the central section of a diaphragm 28 forming one wall of the cell 25. The diaphragm 28 is secured about its margin to a plate 29 by means of a clamping ring 30 which is secured to the plate 29 by suitable means such as a plurality of screws 31. The plate 29 is provided with a central cavity 32 forming with the diaphragm 28 a chamber or reservoir for liquid, and the conduit O communicates with such reservoir. Preferably, the diaphragm 28 is of the type shown wherein an annular fold 28a extends about the periphery of the pressure pad 26, whereby such fold will flex or roll as the chamber is compressed or expands, thus resulting in a load indication that is not in error due to diaphragm distortion.

In order to protect the cell 25 from the weather and dirt, a housing or closure 34 is carried by the pressure pad 26, and secured thereto by screws 35 or the like.

It should be noted at this point that since the lever 24 is pivoted on the pin 23 to the lever arm 20 between the latter and the plate 22, the relative movement of the pressure pad 26 and the cell 25 is in a predetermined arcuate path about the pin 23 and without relative lateral or cocking movements, since the cell is rigidly carried by the lever 24. In this connection, the lever 24 is welded as at 36 (see FIG. 4) to a plate 37 to which the cell plate 29 is secured as by screws 38. Preferably, moreover, the cell and pad are disposed substantially radially to the pivot pin 23.

In accordance with one of the features of the invention, means are provided for effectively reducing and minimizing the effect of friction due to engagement of the load sensing lever 24 with the line L. To this end, the lever 24 is cross-slotted as at 40, and disposed in this slot is an arcuate inner bearing race 41. Anti-friction bearings or balls 42, as here shown, ride on the inner race 41 and are engaged by an outer arcuate bearing race 43 which is shiftable within the slot 40 of the lever 24 and which has a line engaging pad or block 44 welded or otherwise connected thereto.

Means are provided for retaining the outer bearing race against displacement, and as illustrated, such retaining means includes a pair of opposed plates 45, 45 spaced at opposite sides of the bearing races and welded as at 46 (see FIG. 4) to the plate 37, which as previously described, is connected to the sensing means S. Disposed at opposite sides of the line engaging pad 44 is a pair of outer bearing race retainers 47, 47 which are welded as at 47a or otherwise suitably secured to plates 45, 45, respectively. Accordingly, the outer race 43 is free for arcuate movement about the inner race 41 of the anti-friction bearing means responsive to variations in the tension of line L, thus to minimize frictional influence on the resultant reading at the indicator I.

To assure rigidity, a suitable number of tie bolts 48 extend through bearing retainer plates 45 and the lever 24, and a further tie bolt 49 extends through the outer extremities of the plates 45. The latter tie bolt also serves as a retainer for the line L while the line is slack.

Preferably, the lever 24, as best seen in FIG. 2, has a terminal projection or tongue 24a engageable with a stop pin 24b disposed between the lever arm 20 and the plate 22, to limit movement of the lever 24 away from the arm 20, thus to facilitate installation of a line.

In order to assure clearance within the slot 40 for the outer bearing race 43, a screw 50 is threaded into the lever 24 so as to extend into the slot 40 for engagement with the line engaging pad 44. When a line is being installed in the anchor and sensing device, the screw 50 will be run into the slot 40 to hold the outer bearing race 43 and pad 44 in engagement with the opposite end of the slot until the line is anchored and some load has been applied to the line. Following this, the screw 50 will be backed out so as to leave the outer bearing race 43 free for movement as additional load, i.e., the load to be measured, is imposed on the line.

From the foregoing, it will be apparent that an improved load sensing device for line anchors has been provided wherein the effect of friction on an ultimate load indication has been virtually minimized so that extreme accuracy is obtained.

While specific structural details have been shown and described, it should be understood that changes and alterations may be resorted to without departing from the spirit of the invention as defined in the appended claims.

We claim:

1. A load sensing line anchor comprising: a support; anchoring means for the line on said support; an arm projecting from said anchoring means; a line engaging member pivotally connected to said arm and having a portion opposed to a portion of said arm; and load sensing means interposed between said opposing portions of said member and said arm; said load sensing means comprising a hydraulic cell having a diaphragm and a pressure pad engaged with said diaphragm, said diaphragm and pressure pad being coengaged on a plane substantially radial to the pivotal connection of said line engaging member to said arm.

2. A load sensing line anchor comprising: a support; anchoring means for the line on said support; an arm projecting from said anchoring means; a line engaging member pivotally connected to said arm; a hydraulic cell carried by said member and having a diaphragm disposed substantially radially to the axis of pivotal movement of said member relative to said arm; a pressure pad carried by said arm and engageable with said diaphragm to deflect the latter responsive to load on said line, and anti-friction bearing means for enabling friction free movement of said line relative to said line engaging member.

3. A load sensing line anchor comprising: a support; anchoring means for the line on said support; an arm projecting from said anchoring means for deflecting said line; line engaging means carried by said arm; line load-sensing means interengaged between said line engaging means and said arm and said line engaging means including anti-friction bearing means for enabling friction-free movement of said line relative to said line engaging means, said anti-friction bearing means including a pair of relatively movable parts, and releasable means for preventing relative movement of said parts.

4. A load sensing line anchor comprising: a support; anchoring means for the line on said support; an arm projecting from said anchoring means for deflecting said line; line engaging means carried by said arm; line load-sensing means interengaged between said line engaging means and said arm said line engaging means including a relatively fixed bearing race; a shiftable bearing race; and anti-friction bearing elements interposed between said races for enabling friction-free movement of said line relative to said fixed race.

5. A load sensing line anchor comprising: a support; anchoring means for the line on said support; an arm projecting from said anchoring means for deflecting said line; line engaging means carried by said arm; line load-sensing means interengaged between said line engaging means and said arm said line engaging means including a relatively fixed bearing race; a shiftable bearing race; anti-friction bearing elements interposed between said races for enabling friction-free movement of said line relative to said line engaging means; and releasable means for preventing relative movement of said races.

6. Load responsive means for a deflected line type load indicating system comprising: an arm for deflecting a line; line engaging means including a member shiftably connected to said arm; said member and said arm having opposing relatively movable portions; load sensing means interposed between said portions; said member having a slot; an inner bearing race fixedly connected to said member in said slot; a shiftable bearing race disposed in said slot in opposed relation to said inner bearing race; and anti-friction elements interposed between said races.

7. A load sensing line anchor comprising: a support having a stub shaft projecting therefrom; a drum rotatably mounted on said stub shaft; means on said drum for anchoring a line thereto with said line wrapped about said drum to impart a rotative moment thereto responsive to load on the line; an arm projecting from said drum; a member shiftably mounted on said arm for movement towards and away from said arm and engageable with a load sustaining portion of said line; load sensing means between said member and said arm for sensing the load on said line responsive to the rotative moment imposed on said drum; and anti-friction bearing means carried by said member for engagement with said line.

8. A load sensing line anchor comprising: a support having a stub shaft projecting therefrom; a drum rotatably mounted on said stub shaft; means on said drum for anchoring a line thereto with said line wrapped about said drum to impart a rotative moment thereto responsive to load on the line; an arm projecting from said drum; means engageable with a load sustaining portion of said line including a member pivotally connected to said arm; and load sensing means interposed between said arm and an opposing portion of said member.

9. A load sensing line anchor comprising: a support having a stub shaft projecting therefrom; a drum rotatably mounted on said stub shaft; means on said drum for anchoring a line thereto with said line wrapped about said drum to impart a rotative moment thereto responsive to load on the line; an arm projecting from said drum; means engageable with a load sustaining portion of said line including a member pivotally connected to said arm; and load sensing means interposed between said arm and an opposing portion of said member; said load sensing means comprising a hydraulic displacement device.

10. A load sensing line anchor comprising: a support; a drum rotatably mounted on said support; anchoring means for connecting said line to said drum with said line wrapped about the drum to impart a rotative moment to said drum responsive to load on said line; an arm projecting from said drum; line engaging means pivotally connected to said arm and engageable with a load sustaining portion of said line to deflect the same so that the line of load on said drum is aligned with the axis of rotation of the drum; and load sensing means interposed between said line engaging means and said arm.

11. A load sensing line anchor comprising: a support; a drum rotatably mounted on said support; anchoring means for connecting said line to said drum with said line wrapped about the drum to impart a rotative moment to said drum responsive to load on said line; an arm projecting from said drum; line engaging means pivotally connected to said arm and engageable with a load sustaining portion of said line to deflect the same so that the line of load on said drum is aligned with the axis of rotation of the drum; said line engaging means including an anti-friction bearing for preventing frictional engagement of said line and said line engaging means; and load sensing means interposed between said line engaging means and said arm.

12. A load sensing line anchor comprising: a support; a drum rotatably mounted on said support; anchoring means for connecting said line to said drum with said line wrapped about the drum to impart a rotative moment to said drum responsive to load on said line; an arm projecting from said drum; line engaging means pivotally connected to said arm and engageable with a load sustaining portion of said line to deflect the same so that the line of load on said drum is aligned with the axis of rotation of the drum; load sensing means interengaged between said line engaging means and said arm; said load sensing means comprising a hydraulic displacement device having a liquid containing cell closed at one side by a diaphragm; and a pressure pad engaged with said diaphragm.

13. A load sensing line anchor comprising: a support; a drum rotatably mounted on said support; anchoring means for connecting said line to said drum with said line wrapped about the drum to impart a rotative moment to said drum responsive to load on said line; an arm projecting from said drum; line engaging means pivotally connected to said arm and engageable with a load sustaining portion of said line to deflect the same so that the line of load on said drum is aligned with the axis of rotation of the drum; load sensing means interengaged between said line engaging means and said arm; said load sensing means comprising a hydraulic displacement device having a liquid containing cell closed at one side by a diaphragm; and a pressure pad engaged with said diaphragm; said diaphragm and said pad being coengaged on a plane substantially radial to the pivotal connection of said line engaging means to said arm.

14. A load sensing line anchor comprising: a support; a drum rotatably mounted on said support; anchoring means for connecting said line to said drum with said line wrapped about the drum to impart a rotative moment to said drum responsive to load on said line; an arm projecting from said drum; line engaging means pivotally connected to said arm and engageable with a load sustaining portion of said line to deflect the same so that the line of load on said drum is aligned with the axis of rotation of the drum; load sensing means interengaged between said line engaging means and said arm; said load sensing means comprising a hydraulic displacement device having a liquid containing cell closed at one side by a diaphragm; a pressure pad engaged with said diaphragm; said diaphragm having an annular fold forming a central planar section; and said pressure pad engaging said diaphragm within said fold.

References Cited in the file of this patent

UNITED STATES PATENTS

| | | |
|---|---|---|
| 1,435,603 | Hanser | Nov. 14, 1922 |
| 2,092,303 | Conrad | Sept. 7, 1937 |
| 2,277,925 | MacClatchie et al. | Mar. 31, 1942 |
| 2,380,433 | Hathan | July 31, 1945 |
| 2,488,070 | Spalding | Nov. 15, 1949 |
| 2,743,606 | Webber | May 1, 1956 |
| 2,807,957 | Decker | Oct. 1, 1957 |

FOREIGN PATENTS

| | | |
|---|---|---|
| 793,702 | Great Britain | Apr. 23, 1958 |